United States Patent [19]

Ueno et al.

[11] 3,767,855

[45] Oct. 23, 1973

[54] PULSE POSITION MODULATION COMMUNICATION SYSTEM

[75] Inventors: Yoshito Ueno; Mitsuo Kajitani; Yukio Takimoto; Takashi Shinoda, all of Tokyo, Japan

[73] Assignee: Nippon Electric Company, Limited, Tokyo-to, Japan

[22] Filed: Feb. 22, 1972

[21] Appl. No.: 227,743

[30] Foreign Application Priority Data

Feb. 25, 1971 Japan ................................ 46/9828

[52] U.S. Cl. ................ 178/68, 325/38 R, 325/143, 329/107

[51] Int. Cl. ............................................ H04b 1/04

[58] Field of Search .................... 178/68; 325/38 R, 325/38 B, 38 A, 39, 141, 143, 321, 325; 329/107; 332/9 R, 11 R, 11 D; 340/347 DD

[56] References Cited

UNITED STATES PATENTS

| | | | |
|---|---|---|---|
| 3,569,955 | 3/1971 | Maniere | 340/347 DD |
| 3,162,857 | 12/1964 | Sanders | 325/143 X |
| 3,492,578 | 1/1970 | Gerrish et al. | 325/38 A UX |
| 3,337,863 | 8/1967 | Lender | 332/11 X |
| 3,317,720 | 5/1967 | Lender | 340/347 DD X |
| 3,427,444 | 2/1969 | Tang | 325/38 R UX |
| 3,124,652 | 3/1964 | Biagi et al. | 329/107 X |

*Primary Examiner*—Felix D. Gruber
*Assistant Examiner*—Jerry Smith
*Attorney*—Ostrolenic et al.

[57] ABSTRACT

A pulse position modulation communication system which elminates the need for generating independent synchronizing pulses at transmitter facility. Numerical data is generated sequentially and is temporarily stored. The next occurring data is summed with the previously stored data, and the sum is transmitted in a position within a time frame representative of the numerical value. Simultaneously therewith this resultant sum replaces the previously stored data for summation with the next received data. Addition is performed by a modulo-M summing operation (i.e., ignoring any carry) where the value of M is the same as the number of time slots in each time frame. Subtraction of received pulse position data is performed in a similar manner at the receiver to restore the data to its original form.

5 Claims, 37 Drawing Figures

| | | | |
|---|---|---|---|
| ($\alpha$) | $\alpha_i = 2$ | $\alpha_{i+1} = 3$ | $\alpha_{i+2} = 6$ |
| ($\beta$) $\beta_{i-1} = 0$ | $\beta_i = 2$ | $\beta_{i+1} = 5$ | $\beta_{i+2} = 3\ (=5+6-8)$ |
| ($\gamma$) $\gamma_{i-1} = \phi$ | $\gamma_i = \phi+2$ | $\gamma_{i+1} = \phi+5$ | $\gamma_{i+2} = \phi+3$ |
| ($\ell$) | $\ell_i = 2$ | $\ell_{i+1} = 3$ | $\ell_{i+2} = 6\ (=-2+8)$ |

TIME: $t_i$, $t_{i+1}$, $t_{i+2}$, $t_{i+3}$

PULSE POSITION MODULATION COMMUNICATION SYSTEM

This invention relates to a pulse position modulation (PPM) communication system which is adapted to transmit digital information in the PPM fashion.

BACKGROUND OF THE INVENTION

In a conventional pulse position modulation communication system, the transmitting pulse position is caused to shift by an analogue signal input, and demodulation is performed on the receiver side by taking the average repetition position of the pulse as the reference. Among the defects of such a conventional PPM communication system are the difficulty of the DC transmission of analogue signals in the case of transmission of such analogue signals and the marked deterioration in the signal quality when applied to many repeatered systems.

Transmission of digital codes (including digital codes given by the analogue-to-digital conversion) is featured by a case with which DC transmission can be performed, the suppression of the increase in noise for simplicity of regenerative repeating even in many repeatered systems, and the possibility of composing an effective transmission system.

In a system consisting of a mere combination of a conventional PPM communication system and a digital system, synchronization is hard to maintain, as will be mentioned later.

As indicated in FIG. 1A, for example, the digital signal is divided into words W, each having N bits (3 bits in the illustration), and in order to transmit the digital code for one word by one transmitting pulse, the transmitting word period $T_1$ is divided into $2^N$ time slots, as shown in FIG. 1B, and the transmitting pulse position is assigned to any one of the $2^N$ time slots according to the digital codes for one word. For the example given, $2^N = 8$ (i.e., N = 3). Thus, there are eight time slots, as shown in FIG. 1B.

In FIGS. 1A and 1B the first, second and third three-bit digital code words represent the decimal values 2, 3, and 6 respectively. Under the conventional PPM system, pulses are placed in the second, third, and sixth time slots respectively, selected out of the eight time slots in each transmitting word period $T_1$. These pulses are transmitted as a pulse position modulation signal. ON the receiver side demodulation is carried out by counting in each time interval $T_1$ the number of time slots from the begining of each word to the appearance of the data-carrying pulse. This conventional system does not enable us to ascertain the end of a word and the beginning of the succeeding one. To permit such detection a synchronizing pulse $P_W$, marking the beginning of each code word, is inserted at the transmitter, as shown in FIG. 1C. The synchronizing pulse $P_W$ is detected at the receiver to give the reference time point for the demodulation of the PPM pulse. This method requires twice the average transmitting pulse power, because a synchronizing pulse $P_W$ must be transmitted with respect to each information pulse $P_S$. Economical utilization of transmission power is realized by the use of the frame synchronization in place of the word-synchronization. In this method one synchronizing pulse $P_f$ is inserted for several words, as shown in FIG. 1D.

As outlined above, the disadvantages of the conventional PPM communication system are that the extra transmission power is needed for the synchronizing pulses and that extra circuitry is needed at the transmitting and receiving ends for synchronization purposes. The overall circuitry is thereby accordingly complicated.

BRIEF DESCRIPTION OF THE INVENTION AND OBJECTS

It is a object of this invention to provide a pulse position modulation communication system without resorting to the use of snychronizing pulses. This makes it possible to save the transmission power and to dispense with the complicated circuits otherwise required for synchronization.

It is another object of this invention to provide a pulse position modulation communication system in which the digital codes of a plurality of channels are easily multiplexed into a multiplexed PPM signal which is of such a nature as to facilitate the channel separation at the receiving end.

It is still another object of this invention to provide a pulse position modulation communication system which minimizes errors in the demodulated digital quantity.

In the system of this invention, an input digital quantity and its immediately preceding digital quantity are added in succession on the basis of modulo M (M being a positive integer equal to or larger than 2), to give to each information pulse a time slot selected out of M time slots. On the receiver side the incoming pulse train is converted into a digital quantity corresponding to the number of time slots between two adjacent pulses. Then, a modulo M subtraction is performed between the two adjacent digital quantities thus converted. This subtraction serves to reproduce the original digital signal.

BRIEF DESCRIPTION OF THE FIGURES

Other objects, features, and advantages of this invention will be apparent from the following description taken in conjunction with the accompanying drawings, wherein.

DETAILED DESCRIPTION OF THE FIGURES

Figure 2A:
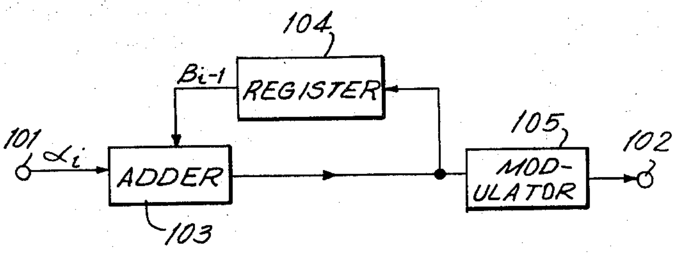
FIGS. 2A and 2B are block diagrams illustrating an embodiment of this invention.

The principle of the PPM communication system of this invention will now be described with reference to the embodiment of FIGS. 2*a* and 2*b*.

On the transmitter side, an input digital quantity $\alpha_i$, which is applied to a transmitter input terminal 101, and the content $\beta_i$−1 of a register 104 are applied to an adder 103. Thus, a modulo M addition or $\alpha_i$ $\beta_i$−1 is performed. The result of this addition $\beta_i$ is written into the register 104 at the moment the next input digital quantity is applied to the input terminal 101. The result of the addition at the adder 103 is fed to a modulator 105, and pulses are supplied to a transmitter output terminal 102 in time slots corresponding to the result of addition $\beta_i$.

Figure 2B:
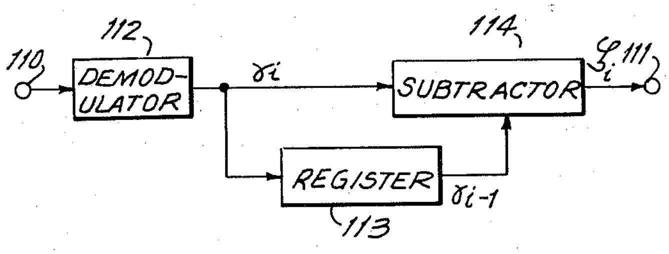

On the receiver side, as shown in FIG. 2B, the receiving pulse position modulated signal applied to a receiver input terminal 110 is converted (i.e., demodulated) into a digital quantity $\gamma_i$, through a process opposite that of modulator 105. This digital quantity $\gamma_i$ is applied to a register 113 and a subtractor 114. The register 113 stores the immediately preceding digital quantity $\gamma_i$−1 while digital quantity $\gamma_i$ is being received and furnishes one more input to the subtractor 114. At the subtractor 114, a modulo M subtraction between two digital quantitites $\gamma_i$ and $\gamma_i$−1, or $\gamma_i$ $\gamma_i$−1, is carried out. As a result of this subtaction, a digital quantity $\zeta_i$ is obtained at the receiving output terminal 111.

Now a description will be given referring to the timing chart of FIG. 1 and the table of FIG. 3. Let it be assumed that the 3-bit digital codes are applied to the input terminal 101, as shown at FIG. 1A. In this case, M is given by $M = 2^3 = 8$. Assuming here that the content of the register 104 is 0 at the time point $t_i$, $\beta_i = 2$ is obtained as the output of the adder 103 when digital code (010) representative of decimal value 2 is applied as an input $\alpha_i$. Likewise, the content of the register 104 becomes 2 at the time point $t_{i+1}$. When this is added to the content 3 of input $\alpha_{i+1}$, the output of the adder 103 becomes 5. At the next time point $t_{i+2}$, 6 is added as an input digital quantity. In this case 3 is obtained as $\beta_{i+2}$, because for a modulo number exceeding 8, such as 5 + 6 = 11, 8 is subtracted from the sum to produce 3, as $\beta_{i+2}$.

Figures 1A, 1B, 1C, 1D, 1E:
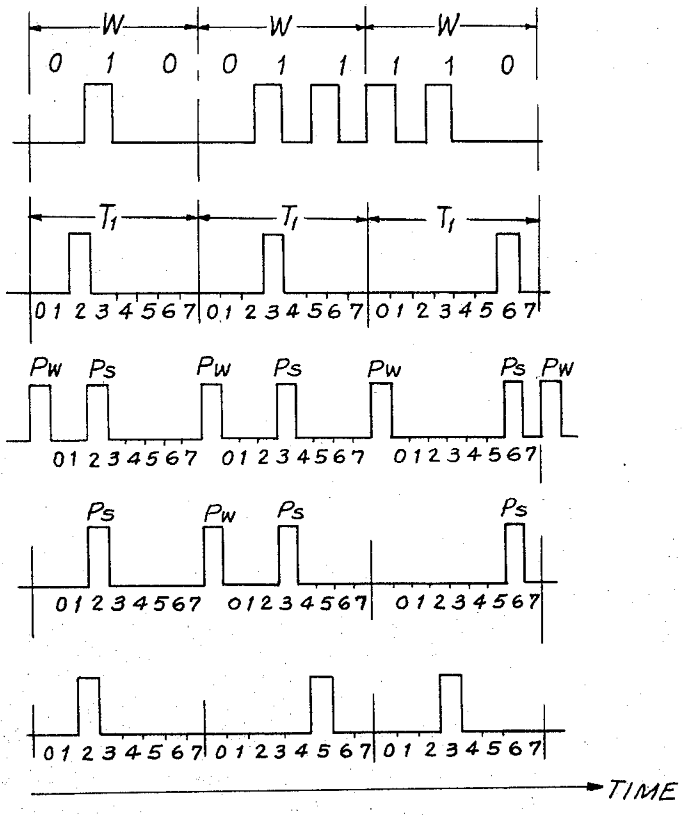
FIGS. 1A through 1E are waveform diagrams illustrating the operation of a pulse position modulation communication system according to this invention.

A series of resultant values $\beta_{i-1}$, $\beta_i$, $\beta i$+1, $\beta i$+2, . . . , which in this case may be 0, 2, 5, 3, . . . are generated, and the modulator sends out pulses in the time slots corresponding to these values, as shown at FIG. 1E.

At the receiving end the incoming processed pulse train must be translated first. For this purpose the demodulator 112 provisionally generates a digital quantity $\Psi$ as the demodulated output with respect to pulse $\beta_{i+1}$ and the output is stored in register 113. On the receipt of pulse $\beta_i$, the demodulator 112 performs demodulation as $\gamma_i = \Psi + \beta_i = \Psi + 2$ and the subtractor performs a subtraction $\gamma_i$ $\gamma_{i-1}$. Thus, a digital quantity $\alpha_i$ can be correctly reproduced as the output $\zeta_i$. Succeeding pulses are similarly subjected to the modulo-8 subtraction to develop the outputs $\zeta$i+1, $\zeta_{i+2}$, . . . .

The foregoing description may be generalized as follows: If the digital code $\alpha_i$ is applied to satisfy an equation $\alpha_j + \beta_j$−1 M: (M being a modulo number, for example, the second word in FIG. 1A), the digital code $\alpha_j$ is transmitted in the time slot corresponding to $\beta_j$ ($\beta_j = \alpha_j + \beta_{j-1}$), as counted from the first time slot of the relevant word. For $\alpha_j + \beta_{j-1} > M$ (for example, the third word in FIG. 1), the time slot for pulse transmission corresponds to the $\beta_j$-th time slot ($\beta_j = \alpha_j + \beta_{j-1} - M$) as counted from the first time slot of the relevant word. In this way the results of the modulo-M addition of $\alpha_j$ and $\beta_{j-1}$ can be assigned to the time slot numbers.

Another embodiment of this invention will be described hereunder. Among the various conceivable modes of an input digital quantity, such as n-ary code or reflected binary code, the binary code will be analysed. If $\alpha_i$ is a three digit binary code, $\alpha_i$ can be expressed by:

$$\alpha_i = a_1 2^0 + a_2 2^1 + a_3 2^2$$

If $a_1$, $a_2$, and $a_3$ are given in parallel, $a_1$, $a_2$, and $a_3$ may be considered as digital signals for three channels independent of each other. Therefore, a three-channel multiplex transmission system for a one-bit digital signal (instead of 3-bit signal $\alpha_i$) will be taken into consideration.

Figures 5A, 5B, 5C, 5D, 5E, 5F, 5G, 5H, 5J, 5K, 5M, 5N:
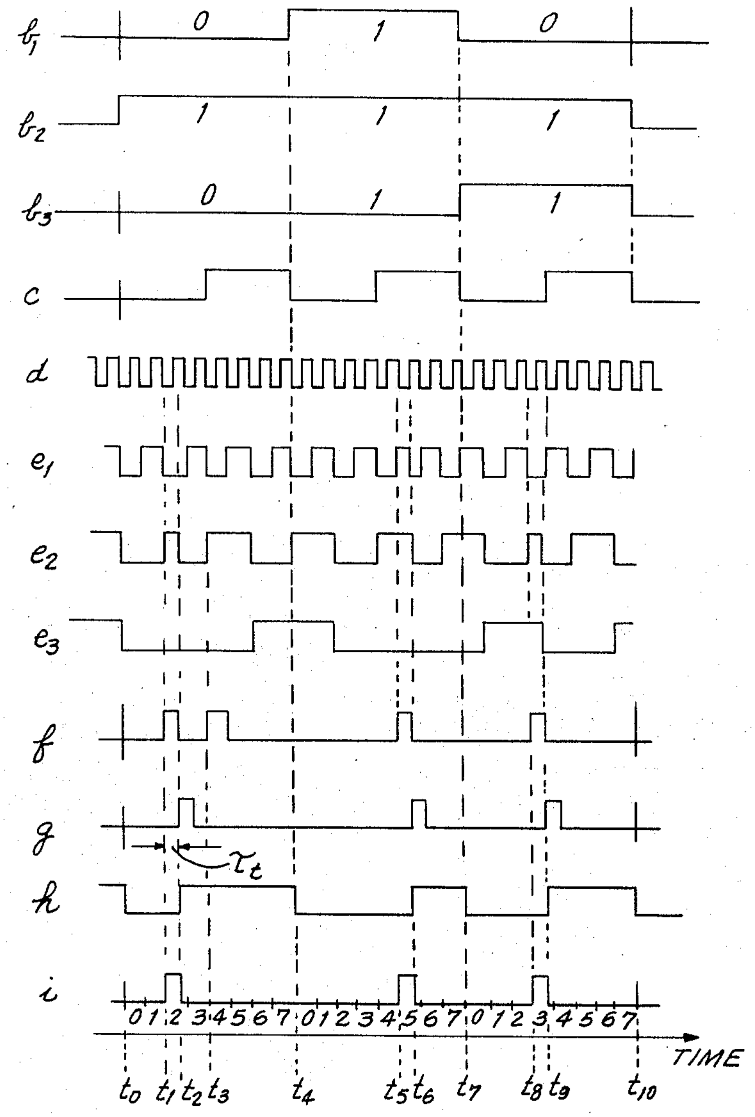
FIGS. 5A–5N are waveforms comprising a timing chart useful in explaining the operation of the transmitter shown in FIG. 4.

Then, on the transmitter side, the values $a_1$, $a_2$ and $a_3$ of each digit of $\alpha_i$ are applied to a buffer circuit 1 (see FIG. 4) and NRZ signals $b_1$, $b_2$, and $b_3$, as shown in FIGS. 5A–5C, are produced in synchronism with the clock signal *c* for the coincidence detection circuit 2. On the other hand, the clock signal *d* shown in FIG. 5D is applied to a 3-bit binary counter 3 from a timing circuit 4, and square waveforms as shown by $e_1$, $e_2$ and $e_3$ in FIGS. 5F, 5G and 5H are produced respectively at one-half, one-fourth, and one-eigth of the frequency of the clock signal. These square wave outputs are obtained at terminals 7, 8, and 9. Since each of $e_1$, $e_2$, and $e_3$ is controlled by the waveform *g* as described hereinbelow, the waveforms as shown in FIGS. 5F, 5G and 5H are obtained. These outputs are respectively compared with NRZ signals $b_1$, $b_2$ and $b_3$ at is the coincidence detection circuit 2. Only when $b_1$ and $e_1$, $b_2$ and $e_2$, and $b_3$ and $b_3$ are equal (i.e., high) at the same time, the coincidence output f (FIG. 5J) produced.

Figure 6:
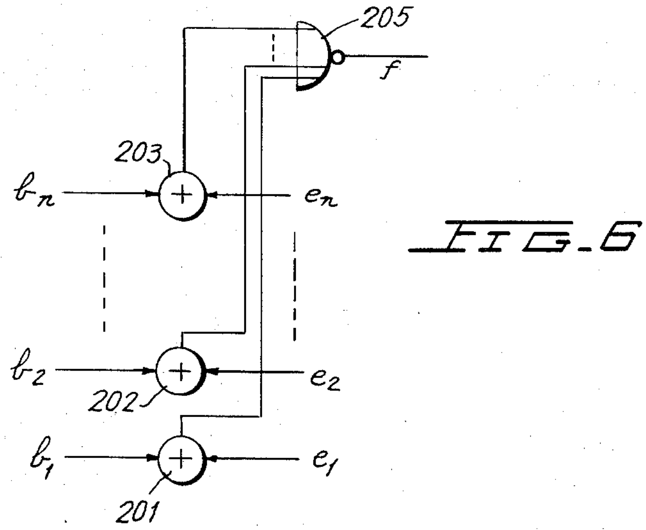
FIG. 6 is a circuit diagram illustrating an example of the coincidence detection circuit shown in FIG. 4.

The coincidence detection circuit 2 is composed, as shown in FIG. 6, of exclusive OR circuits 201, 202, . . . 203 to which $b_1$, $b_2$ . . . $b_n$ and $e_1$, $e$. . . $e_n$ are respectively applied and a NOR gate 205 to which the outputs of these exclusive OR circuits are applied.

Figures 3, 4:
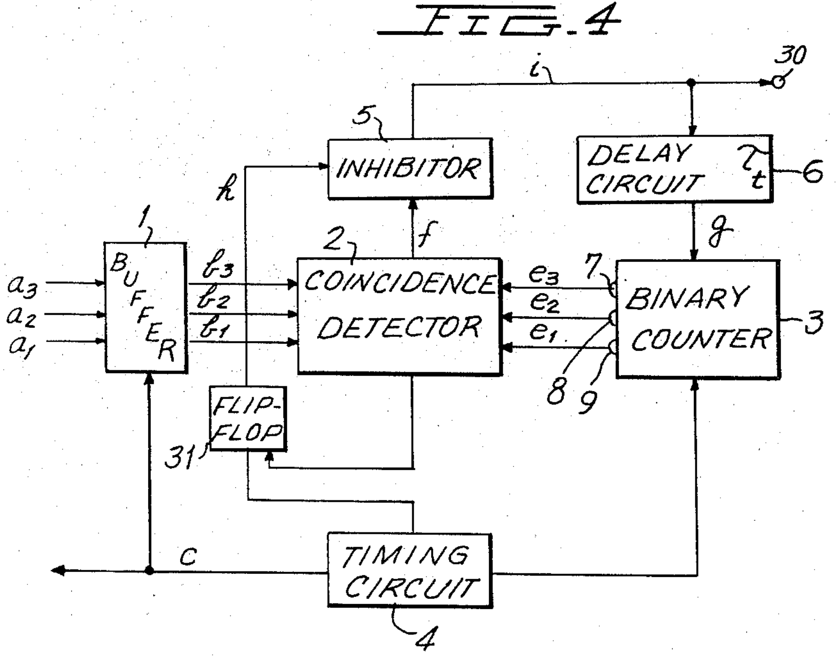
FIG. 3 is a table indicating the conditions of signals at various points for an example of the operation of the system of this invention.
FIG. 4 is a block diagram of a transmitter in another embodiment of this invention.

Turning back to the description of FIG. 4, if the coincidence output *f* is produced from the trailing edge of the first coincidence output *f* of each word period to the end of the word designated by the timing circuit, or, in other words, during the time intervals $t_2 \sim t_4$, $t_6 \sim t_7$, and $t_9 \sim t_{10}$ in FIG. 5, the coincidence output is inhibited by an inhibitor circuit 5 using the pulsewidth of signal *h*. It follows therefore that the original digital signal becomes the NRZ signals $b_1$, $b_2$, and $b_3$ and the coincidence output *f* is produced at time points $t_1$, $t_3$, $t_5$, and $t_8$, where $b_1$, $b_2$, and $b_3$ are in coincidence respectively with square wave outputs $e_1$, $e_2$, and $e_3$. Since the output *f* occuring at time point $t_3$ falls within a word for the pulse transmitted at $t_1$, the output *f* is inhibited by an inhibit signal delivered from the timing circuit 4 via a flip-flop 31. Therefore the output *i* of inhibitor 5 occurs only at $t_1$, $t_5$, and $t_8$.

In this way the first coincidence output *f* within each word period appears at the output terminal 30, as shown in FIG. 4. This output pulse *i* is fed to the transmitter to modulate a carrier wave, which may be electromagnetic wave or a light beam.

Part of this output pulse *i* is caused to pass through a delay circuit 6, having delay time $\tau$, and its output *g* causes binary counter 3 to reset so as to obtain the waveforms $e_1$, $e_2$, and $e_3$, as mentioned previously. Specifically, the outputs at the termi-nals 7, 8, and 9 are all restored to 0 at the moment of the arrival of the output $g$. Thenceforth the binary counter 3 resumes counting of the clock signal $d$ in the same manner as mentioned previously.

Incidentally, as will be apparent from the timing chart of FIG. 5, the divisional number for one word in the case of three channels of binary signals is eight, and the frequency relationship between the frequency $f_d$ of the clock signal $d$ and the frequency $f_c$ of the clock signal for reading in $a_1$, $a_2$, and $a_3$ is given by $f_d = 8 f_c$. As is evident from FIG. 5, waveform $i$ is the same as that shown at FIG. 1E and pulse position modulation using modulo M has been performed.

Figures 8A, 8B, 8C, 8D, 8E, 8F, 8G, 8H, 8J, 8K, 8M, 8N, 8P:
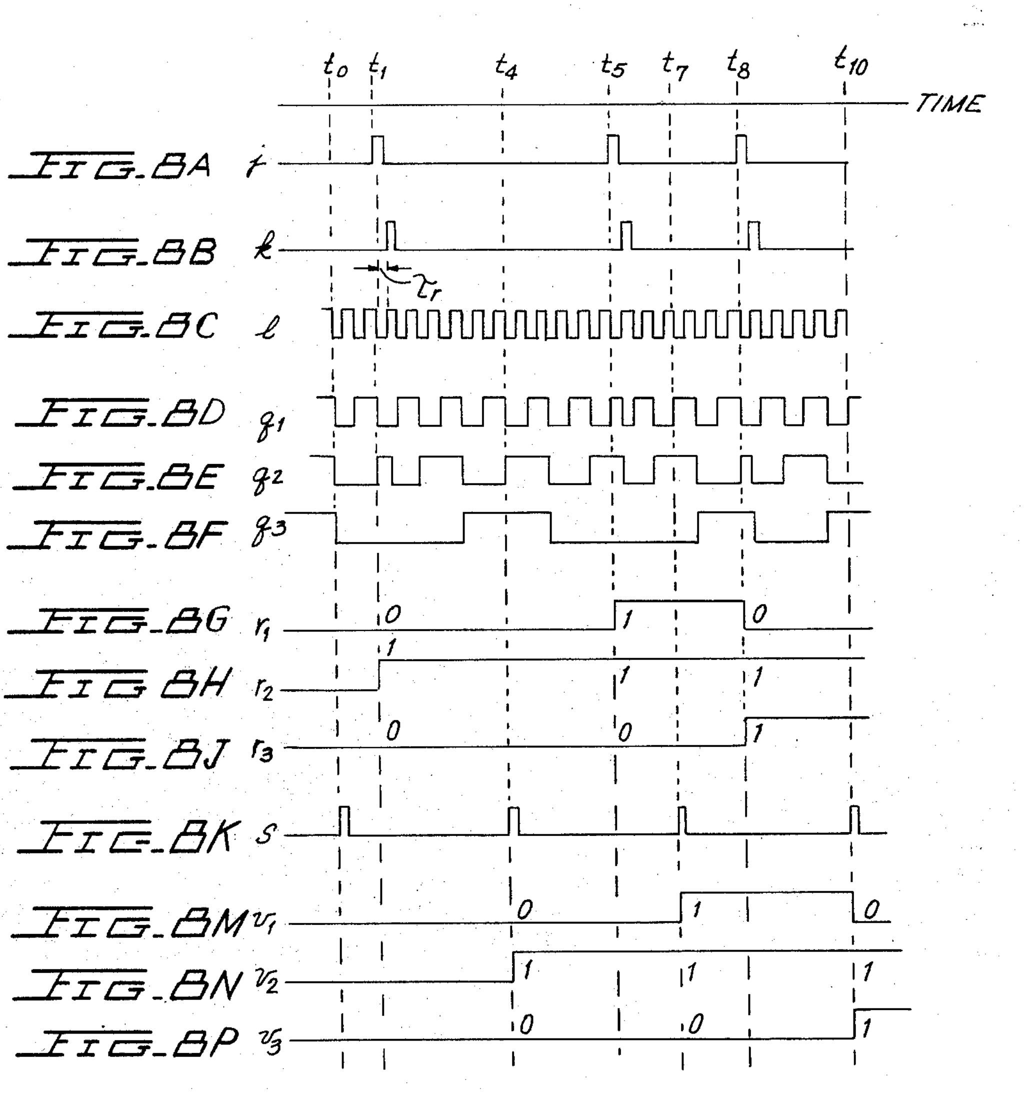
FIGS. 8A–8P are waveforms comprising a timing chart useful in explaining the operation of the receiver shown in FIG. 7.

Next, a description will be given of the receiving side operation, referring to the block diagram of FIG. 7 and the timing chart of FIG. 8. On application of a receiving PPM signal $j$ to receiving input terminal 24, a clock synchronizing circuit 13 regenerates a clock signal $l$ of the same frequency as the clock signal $d$ at the transmitter. Further, an input signal $j$, delayed by a time 96$_r$ by a delay circuit 10, occurs as shown at $k$ (FIG. 8B) to reset a 3-bit binary counter 11. The 3-bit counter 11 counts the clock signal $l$ and outputs the signals $q_1$, $q_2$, and $q_3$, the contents of counter 11 being read into the memory circuit 12 at the moment of arrival of the next receiving signal $j$ to obtain waveforms shown at $r_1$, $r_2$, and $r_3$.

These outputs $r_1$, $r_2$, and $r_3$ are no more than the outputs $q_1$, $q_2$ and $q_3$ derived from counting the number of time slots (clock 1) from the reception of a preceding pulse to the reception of a next pulse at signal $j$ by the 3-bit binary counter 11. This may be considered as the result of obtaining the number of time slots between two succeeding pulses at signal $j$ on the modulo M basis. This is in itself the digital signal applied to the transmitter input terminal. Thus demodulation is performed without relying on word synchronization.

The time spacings of the demodulated codes vary in a manner as shown at $r_1$, $r_2$, and $r_3$ in the timing chart of FIG. 8. In cases where the need arises for deriving the original digital codes at equal spacings, use can be made of a circuit called a "dejitterizer," which consists of an elastic memory (storage) and a phase-locked oscillator. With this circuit, pulse trains with jitters are successively written into the elastic memory, and the stored content is read out in succession by using jitter-free clock pulses as the output of the phase-locked oscillator.

Such a circuit is described in detail in the Bell System Technical Journal, Vol. 44, No. 9 (November, 1965), pages 1843–1885, which is incorporated herein by reference thereto. Therefore, no description will be given here of its detail, for purposes of simplicity.

There also exists a method for achieving the word synchronization without using the dejitterizer. For this method the feature of the pulse position modulation communication system of this invention can be utilized in such a manner that one pulse is invariably transmitted or received for each word, although no synchronizing pulses are inserted on the transmitter side. This method consists in shifting the word phase by one time slot at a time whenever more than one pulse is received during one word period in the word phase which has been preset on the receiving side and in suspending the shift as soon as the state of receiving exactly one pulse per one word is reached. The word synchronization can be detected by counting the number of pulses received during one word period. The word synchronization can be stabilized in the same manner as the known word or frame synchronization.

Figure 7:
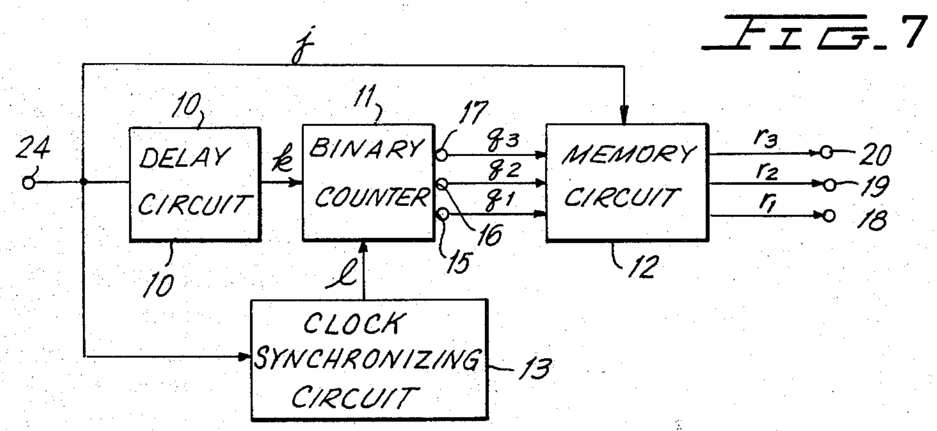
FIG. 7 is a block diagram illustrating an example of the principal part of the receiver corresponding to the transmitter shown in FIG. 4.
Figure 9:
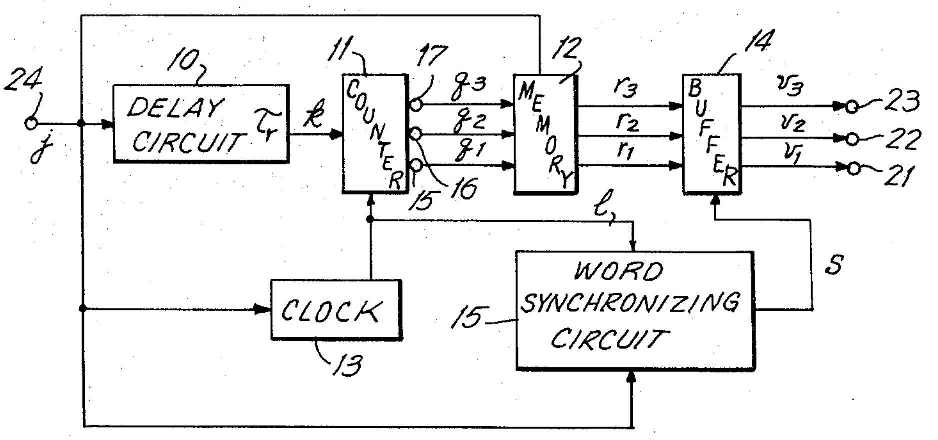
FIG. 9 is a block diagram of a circuit for performing the word synchronization on the receiver side.

FIG. 9 is a block diagram of the receiver in which word synchronization is carried out, wherein like reference numerals are used in FIG. 9 for like constituents in FIG. 7. In the embodiment of FIG. 9, the word synchronizing circuit 15 performs the previously mentioned synchronizing operation and furnishes word spaced pulses $s$, which are obtained from an input signal $j$ and a clock signal $l$ to a buffer circuit 14 (see outputs), so that the outputs $r_1$, $r_2$, and $r_3$ may be read into the correct word phase relation. When word synchronization is achieved, referring to the time chart of FIG. 8, a read-in pulse $s$ occurs at the termination of the same word as was preset on the transmitter side and the buffer circuit 14 reads in $r_1$, $r_2$, and $r_3$ at a constant interval and develops read-out outputs $v_1$, $v_2$, and $v_3$ having the equal spaces.

It has been assumed in the foregoing description that the result of the modulo-M addition is encoded in the natural binary code form for maintaining correspondence to the time slots. When erroneous transmission caused as to the pulse positions due to thermal noise in the transmission path or those in the receiver side timing circuit are taken into consideration, the reflected binary code which produces only a one-bit difference for one digital quantity deviation is preferred for the reduction of the bit error rate.

In this case both the counter 3 in FIG. 4 and the counter 11 in FIG. 7 should be of the reflected binary type. Further, a natural-to-reflected binary code converter and a reflected-to-natural binary code converter need to be provided respectively in the modulator 105 and the demodulator 112 in the embodiment of FIG. 2.

The embodiments of the invention in which an exclusive privilege or property is claimed are defined as follows.

1. A transmitter employing pulse position modulation techniques wherein no independent synchronizing pulses are required, comprising;

input means for sequentially receiving one group of signals at a time wherein each group of signals is comprised of n digital signals representing a numerical value, where n is a real integer;

means coupled to said input means for temporarily storing the last received group of signals;

timing means having first and second outputs, said first output coupled to said storing means for transferring said group of signals from said input means to said storing means at a predetermined time;

binary counter means coupled to said timing means second output for generating a binary output representative of a numerical value, said counter means having n stages, each stage being associated with one of said n digital signals;

coincidence circuit means coupled to said storing means and said counter means for generating an output when coincidence occurs between a digital signal state in one of said stages and its associated signal in said group;

inhibitor means coupled to said coincidence circuit means and said timing means for producing at least one pulse for each favorable coincidence comparison within one of a predetermined number of positions within a time frame and for inhibiting the generation of any additional pulses within the same time frame wherein the position of said produced pulses represents the numerical value of the digital signal in said group of digital signals associated therewith, and wherein each binary signal of a predetermined digital value present in said group of digital signals is generated in a different time frame, said time frames being of equal time duration;

delay means coupled between said inhibitor means and said counter means for resetting said counter means before the occurrence of the next group of pulses at said input means.

2. The transmitter of claim 1 wherein the pulse rate of pulses appearing at said second output is greater than the pulse rate of pulses appearing at said first output.

3. The transmitter of claim 1 wherein the counter means is adapted to generate a maximum count of M, where M is a real integer equal to or greater than 2 and wherein M is equal to the number of time slots in each time frame.

4. A receiver utilizing pulse position modulation techniques comprising:

input means for receiving a series of pulses, each pulse occurring within a different time frame wherein all time frames are of equal length and wherein the position of a pulse in its time frame represents a predetermined numerical value;

clock means coupled to said input means for generating timing signals;

counter means coupled to said input means being reset upon receipt of a pulse from said input means; said counter means being coupled to said clock means for generating signals representing a binary count after having been reset;

memory means coupled to said input means and said counter means for storing the contents of said counter means upon the occurrence of the next signal at said input means;

word synchronizing means coupled to said clock means for generating a narrow pulse representing the beginning of each time frame when the total number of pulse positions in a time frame has been detected;

means coupled to said memory means and said word synrhconizing means for receiving the contents of said memory upon the initiation of the next time frame and only during the occurrence of the pulse from said word synchronizing means representing the initiation of the next time frame delay means coupled between said input means and said counter means for resetting said counter means a predetermined time after application of pulses upon said input means.

5. The receiver of claim 4 wherein the said word synchronizing circuit generates a narrow pulse after developing a count of M, where M is equal to the number of time slots in a time frame.

* * * * *